S. BEERS.
ODOMETER.

No. 15,509.   Patented Aug. 12, 1856.

UNITED STATES PATENT OFFICE.

SMITH BEERS, OF NAUGATUCK, CONNECTICUT.

ODOMETER.

Specification of Letters Patent No. 15,509, dated August 12, 1856.

*To all whom it may concern:*

Be it known that I, SMITH BEERS, of Naugatuck, in the county of New Haven and State of Connecticut, have invented a new and Improved Odometer or Instrument for Indicating the Distance Traveled by Wheel-Vehicles; and I do hereby declare that the following is a full, clear, and exact description of the same, reference being had to the annexed drawings, making a part of this specification, in which—

Figure 1:
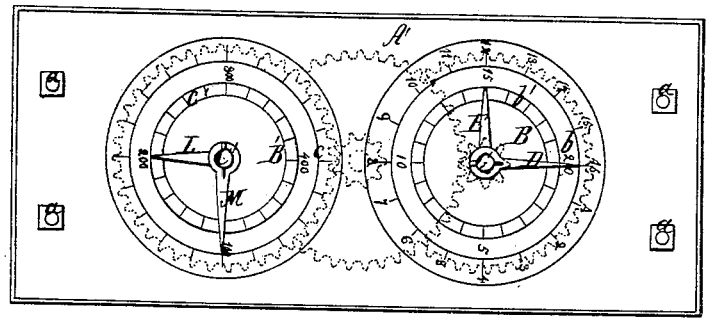
Figure 2:
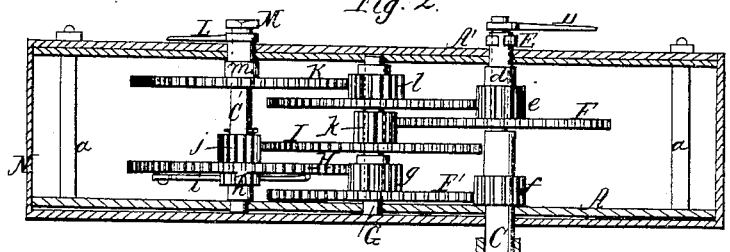
Figure 4:
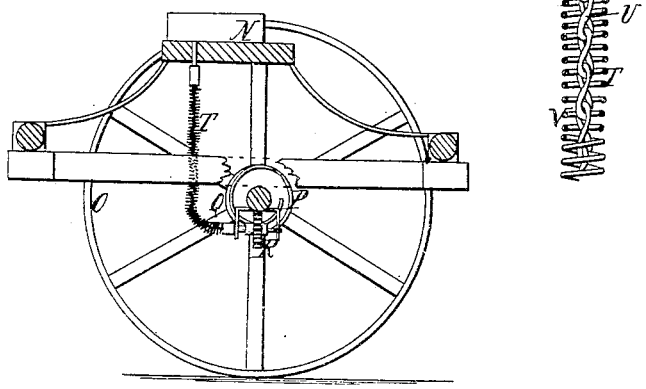
Figure 3:
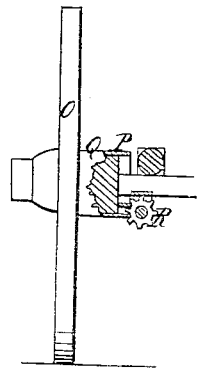

Figure 1, is a face or top view of my improvement. Fig. 2, is a side view of ditto. Fig. 3, is an end view of one of the wheels of the vehicle to which the instrument is attached. Fig. 4, is an inner side view of the same.

Similar letters of reference indicate corresponding parts in the several figures.

My invention consists in the application of an improved mode of connecting the carriage wheel with an indicating apparatus, whereby a derangement of the instrument may not be occasioned by the jolting of the carriage.

To enable those skilled in the art to fully understand and construct my invention, I will proceed to describe it.

A, A', represent two metallic plates secured a requisite distance apart by rods (a). On the outer side of one of the plates A', there are two dials B, B', placed side by side each dial having two concentric graduated circles upon it, as shown in Fig. 1; b, b', being the circles on dial B, and (c), (c') the circles on dial B'.

Between the two plates A, A', there are placed two arbors C, C' the upper ends of which pass through the centers of the dials B, B' and one of the arbors C, extends some distance below the plate A, as shown clearly in Fig. 2. On the upper end of the arbor C, there is placed an index D, the outer end of which traverses over the larger graduated circle (b), on the dial B, and on the arbor C, there is placed loosely a collar (d), the upper end of which extends through the center of the dial B, and has an index E, upon it. The opposite or lower end of the collar (d), has a toothed wheel F, and pinion (e), upon it, the pinion being attached to the toothed wheel. The index E, traverses over the smaller graduated circle (b') on the dial B.

On the arbor C, there is placed a pinion (f), which gears into a toothed wheel F', which is placed loosely on a shaft G, between the two plates A, A'. The wheel F', has a pinion (g), attached to it, which pinion gears into a toothed wheel H, which is placed loosely on the arbor C', and is made to turn the arbor C', in one direction by means of a ratchet (h), on said arbor and a pawl (i), on the wheel H. The wheel H, will turn in the opposite direction without turning the arbor C'.

The wheel H, has a pinion (j), attached to it which pinion gears into a toothed wheel I, which is placed loosely on the shaft G. The wheel I, has a pinion (k), attached to it which pinion gears into the toothed wheel F, on the collar (d), on the arbor C.

The pinion (e), on the collar (d), gears into a toothed wheel J, which is placed loosely on the shaft G, and the wheel J, has a pinion (l), attached to it which pinion gears into a toothed wheel K, on a collar (m), placed loosely on the arbor C'. The collar (m), extends through the dial B', and has an index L, on its upper end, said index traversing over the smaller graduated circle (c'). The upper end of the arbor C', has an index M, attached to it, which index traverses over the larger graduated circle (c).

It will be seen that by twining the arbor C, motion will be given all the toothed wheels and pinions and also the four indexes, and the toothed wheels and pinions, are so proportioned that the index D, on the arbor C, will make only one revolution while the index M, will move only the one twentieth of a revolution, and the index M, will make one revolution while the index E, on the collar (d), will move only the one twentieth of a revolution, and the index L, on the collar (m), moves the one twentieth of a revolution while the index E, makes one revolution.

The parts above described are placed within a suitable box N, provided with a lid the plate A' being uppermost so that the dials may be seen by raising the lid of the box the box being secured to any convenient part of the vehicle; and the arbor C, extending through the bottom of the box, see Fig. 4.

O, represents one of the wheels of the vehicle and P, represents the back band on the hub Q, of said wheel. This back band is of spiral form as shown clearly in Fig.

4, and its inner edge projects beyond the inner end of the hub as shown clearly in Fig. 3.

R, represents a toothed wheel, the axis of which works in bearings attached to the under side of the axle S, of the vehicle, see Figs. 3 and 4. The inner edge of the band P, fits between the teeth of the wheel R; and the band P, in consequence of its spiral form will as the wheel O, rotates turn the toothed wheel R, and the spiral is so formed that the toothed wheel R, will be turned the distance of one tooth at every revolution of the wheel O.

To one end of the axis of the toothed wheel R, there is attached a flexible shaft T, the upper end of which is attached to the lower end of the arbor C. This flexible shaft is formed of a metallic chain U, encompassed by a wire V, bent in spiral form as shown clearly in Fig. 2. By means of this flexible shaft motion is given the arbor C, from the axis of the toothed wheel R; the shaft being bent in right angular form as shown in Fig. 4, or to any necessary or desirable degree.

It will be seen that as the vehicle moves the arbor C, will be turned a certain distance at each revolution of the wheel O, and if the wheel O being one rod in circumference, the index D, will at each movement indicate one rod on the larger graduated circle (b), on the dial B; and a complete revolution of the index D, will indicate 16 rods or the $\frac{1}{20}$ part of a mile the index M, being moved one space on the larger graduated circle (c) on the dial B'. A complete revolution of the index M, indicates the distance of one mile, and a complete revolution of the index E, indicates 20 miles and a complete revolution of the index L, indicates 400 miles.

The above instrument is extremely simple, may be constructed at a small expense and applied to any wheeled vehicle in use and as a positive movement is obtained directly from one of the wheels, its operation is sure.

I do not claim the use of a simple spiral spring for communicating motion from one shaft to another forming an angle with it; but What I do claim as my invention and deside to secure by Letters Patent is—

The flexible connecting shaft T, composed essentially of a chain U, and spiral spring V, or their equivalents, arranged and operating substantially in the manner and for the purpose herein set forth.

SMITH BEERS.

Witnesses:
WM. TUSCH,
JAMES F. BUCKLEY.